Sept. 9, 1969 C. B. BOYER ETAL 3,466,656

REMOTE SWITCHING DEVICE

Filed July 10, 1967

United States Patent Office 3,466,656
Patented Sept. 9, 1969

3,466,656
REMOTE SWITCHING DEVICE

Charles B. Boyer, Robert Michael Conaway, and Franklin D. Orcutt, Columbus, Ohio, assignors to The Battelle Development Corporation, Columbus, Ohio, a corporation of Ohio Filed July 10, 1967, Ser. No. 652,242
Int. Cl. G01d 9/04
U.S. Cl. 346—34 8 Claims

ABSTRACT OF THE DISCLOSURE

An apparatus for making numerous measurments in a remote area using a minimum number of leads to the area. The apparatus comprises (1) a multipoint recorder, (2) a sending unit that provides a signal synchronously with the recorder and thereby advances a remotely located sensor switch, and (3) a synchronizing unit that receives a signal from both the sending unit and the sensor switch and synchronizes their operation at predetermined check points by either rapidly advancing the sensor switch to the check point or by holding the sensor switch at the check point until the recorder reaches that point.

Background of the invention

This invention relates to remote area switch in combination with a synchronizing system that can be used with a multipoint recorder. Previously, it was not possible to make a multitude of temperature measurements in a high-pressure autoclave above 15,000 p.s.i. because of the limited number of lead wires that can penetrate the pressure vessel. This invention solves this problem by making it possible to make numerous sequential temperature measurement with only seven wires penetrating the pressure vessel.

Summary of the invention

Typical apparatus according to this invention for connecting each recording station of a multipoint recorder successively to a corresponding sensitive element responsive to a quantity to be measured, comprising (a) a first actuator for intermittently closing a controlling circuit synchronously with the recording indications of the quantity to be measured, thereby providing a short current pulse to a switching means that moves the electrical connections to the next successive element, (b) a second actuator for providing, at least once each cycle, a synchronous controlling current at one or more of the recorder stations, and (c) sensing means responsive to the synchronous controlling current whereby the responsive-elements switch and recorder are brought into synchronization. The first actuator preferably includes a cam operated switch driven by and synchronously with the recorder print mechanism, and with the cam making one revolution for each recorder point. The second actuator preferably includes a cam operated switch driven by and synchronously with the recorder print mechanism, and with the cam making a minimum of one revolution each cycle of the recorder. The sensing means preferably comprises two relays, one activated by the synchronous controlling current and the other by a like current from the responsive elements switching means, the power for the switch passes through the relay contacts, thereby requiring both relays to be powered at a check point or the interrupter switch rapidly advances the switch to the check point by providing a pulse of current each time the switch reaches a point that is not the check point.

Description of the prefered embodiment

Figures 1, 2:
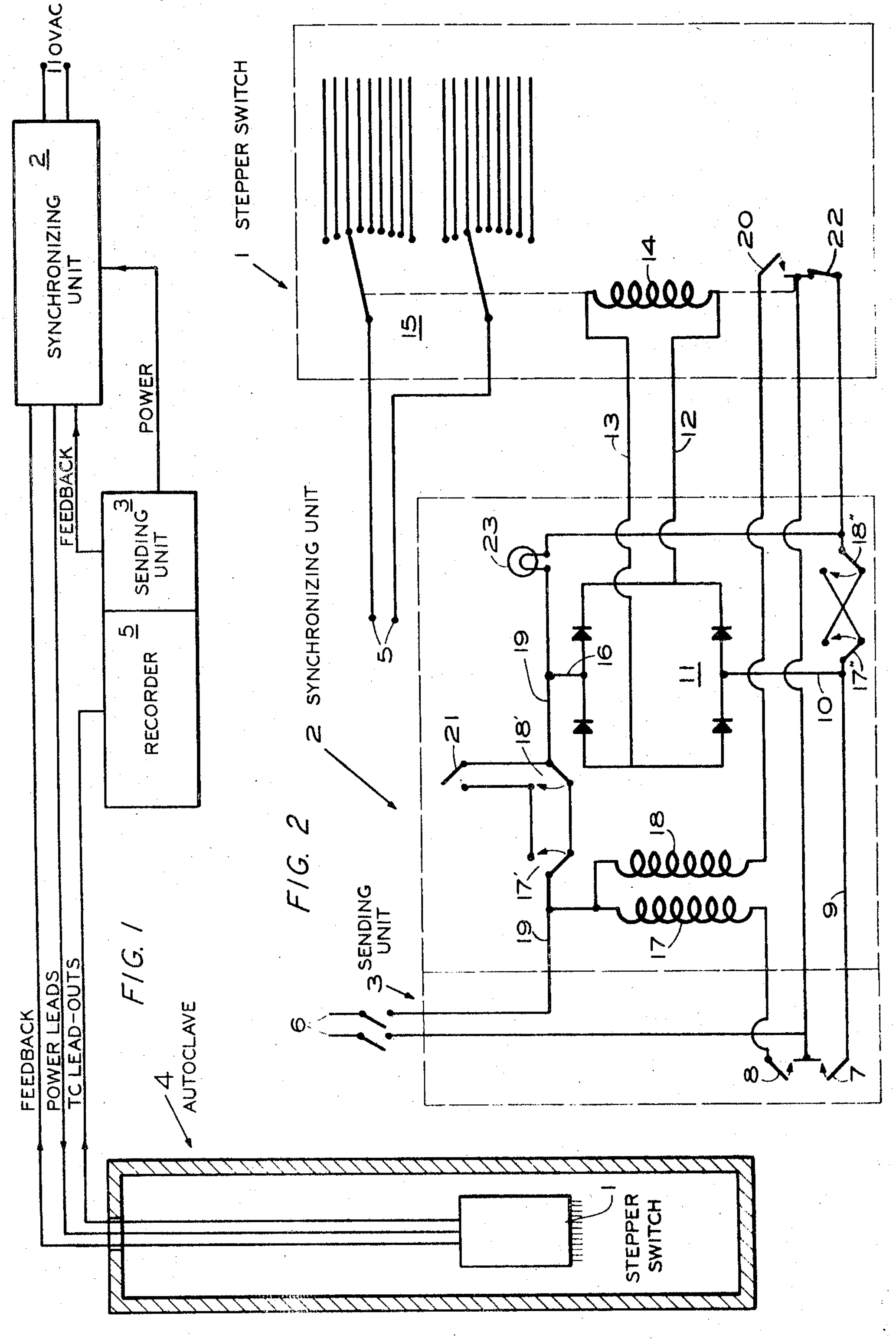
FIG. 1 is a block diagram of the present invention.
FIG. 2 is a schematic diagram of typical apparatus according to the present invention.

The system consists of three main units: The switching means 1, the synchronizer 2, and the sending unit 3. The switching means 1 is positioned in the autoclave 4, and the sending unit 3 is incorporated in the recorder 5. The synchronizer 2 can be located any place outside the autoclave 4.

The preferred switching means is a stepper switch 1 of the spring-driven type. Silicone rubber, thermo-setting tape, and Teflon are used for sealing and for electrical insulation. The switch 1 is in a gas-tight case that has a filtered part for equalizing pressure while keeping foreign material out of the mechanism.

The synchronizer 2 consists of two double pole relays connected back to back. The stepping signal only reaches the stepper switch 1 when these relays are of the same polarity. The polarity of one is controlled by the stepper switch 1 and the other by the recorder 5. Both the stepper switch 1 and recorder 5 change their relay polarity at a check point. The check point in this case was chosen as recording station Number 1 on the recorder and switch connection Number 1 on the stepper switch. If both do not change their polarity simultaneously at the check point the stepper switch 1 will not get a step signal and will remain on switch connection number 1 until the recorder 5 reaches recording station Number 1. Another feature of the device is that it can also be operated such that when the recorder 5 arrives at the check point before the stepper switch 1 does, the stepper switch 1 is automatically advanced to the check point at a rate much faster than the customary step-switching.

The sending unit 3 consists of two cams and two rider switches installed on the recorder 5. One switch closes when the recorder changes each recording station. The other switch closes once the recorder has run through the complete set of recorder stations; i.e., only on recording station Number 1, sending a signal to the synchronizer 2.

FIG. 2 shows a typical embodiment of the invention as designed for making temperature measurements at a plurality of points in an autoclave with only seven wires, penetrating into the autoclave vessel. The power for the switching system is from a standard 110 volt A.C. source 6. There are two cam-opera'ed switches, the signal switch 7 and the check switch 8, which comprise the sending unit 3 of the multipoint recorder 5. Both the signal switch 7 and the checker switch 8 are driven by the print mechanism of the recorder.

The signal switch 7 closes for less than about ½ second for each station. This sends a current pulse down the electrical line 9 and 10 and through the rectifier bridge 11 of the synchronizing unit 2. The current pulse then goes through lines 12 and 13 to the stepper switch 1.

The current pulse then goes through lines 12 and 13 to the stepper switch 1. The current passes through the solenoid coil 14 of the stepper switch 1 located in the autoclave. This causes the stepper switch 1 to advance the electrical connections 15 to the next successive measuring device (thermocouple). The current pulse completes the circuit through leads 12 and 13, the rectifier bridge 11, electrical lead 16, relay contacts 17' and 18' and line 19 to the 110 volt source 6.

The checker switch 8 closes once each cycle such as at recording station Number 1, called the check point. In that the signal switch 7 closes at every point, it is also closed at the check point. The checker switch 8 actuates a relay 17 thereby changing the position of contacts 17' and 17''. FIG. 2 shows the relay 17 in the power off position therefore the closing of the checker switch 8 changes the relay contact 17' and 17'' positions from that shown in FIG. 2.

When relay 17 is actuated, there are two things that may take place: (1) the (stepper) switch 1 advances to the check point (switching position Number 1) upon closing the signal switch 7, or (2) the stepper switch 1 is advanced to one of the other points, in which case it is out of synchronization with the recorder.

The first possibility to be considered is when the recorder 5 and the stepper switch 1 are synchronized at the check point. The stepper switch 1 also has a checker switch 20 which closes at only the check point. This activates relay 18 which opens the line 19 back to the power source 6. This prevents the stepper switch 1 from advancing to switching position Number 2 when the signal switch 7 is closed unless the checker switch 8 is also closed; for the checker switch 8 activates relay 17 thereby completing the circuit between the relay contacts 17' and 18' and thereby allowing the stepper switch 1 to advance to position 2. Upon advancing to position 2, the checker switch 8 and the auotclave checker switch 20 open, thereby cutting the current to relays 17 and 18.

The second possibility is that when the recorder 5 reaches the check point (recording station Number 1), the stepper switch 1 is not at switching position Number 1. In this case, the checker switch relay 17 is actuated such that the relay contacts 17' completes the circuit through the bypass switch 21 instead of through the autoclave-checker-switch relay contacts 18'. The current to advance the stepper switch 1 is through the interrupter switch 22, which closes in the unpowered condition. The current passes through that switch 22 then through the crossover contacts 17'' and 18'' to the stepper switch solenoid 14. In that the interrupter switch 22 is part of the contacts of the stepper switch 1, the interrupter switch 22 will continue to open and close as the stepper switch 1 advances until the cross-over contacts 17'' and 18'' open. This happens when the stepper switch 1 reaches the check point and actuates the relay 18. The device is constructed such that the advancement of the stepper switch to the check point occurs before the signal switch 7 initiates the next subsequent current pulse. If this were not so, it is unlikely that synchronization would occur. The interrupter switch 22 also lights a lamp 23 which gives an indication that the stepper switch 1 is operating.

The recorder 5 and the stepper switch 1 may be synchronized in one other way. Once the stepper switch 1 reaches the check point, the autoclave checker switch 20 will close. This event in turn causes the current relay coil 18 to be energized breaking the parallel circuit at the relay contact 18'. Since it is assumed that non-synchronization exists, relay 17 will remain in the unpowered position corresponding to the recorder 5 not being on the check point. With the cross-over circuit at relay contacts 17'' and 18'' being assumed inoperative, the previously described circuit to ground from the rectifier bridge 11 would not be completed and thus the stepper switch 1 will remain on the check point until the recorder advances to the check point closing the recorder checker switch 18 and, therefore, closing the parallel circuit at the relay contacts 17' and 18'; thereby completing the circuit to the stepper switch 1 with its subsequent synchronous operation with the recorder 5.

While the forms of the invention herein disclosed constitute presently preferred embodiments, many others are possible. It is not intended herein to mention all of the possible equivalent forms of this invention, but some examples of modifications are as follows:

(1) If a direct current source is used, the rectifier bridge 11 can be removed.

(2) Means other than cams may be used to actuate the signal switch 7 and checker switch 8 synchronously with the recorder.

(3) The stepper switch may be replaced by any type of sequencing switch that is responsive to signals from the synchronizer.

It is to be understood that the terms used are merely descriptive rather than limiting, and that changes other than those noted may be made without departing from the spirit or scope of the invention.

We claim:

1. Apparatus for connecting a multipoint recorder to a plurality of sensitive elements responsive to a quantity to be measured, comprising:

(a) a control circuit;

(b) first actuator means responsive to the print mechanism of the recorder to actuate said control circuit to initiate an advancing signal at each recording station;

(c) first switching means adapted for cyclic sequential connecting of the sensitive elements to the recorder in response to said advancing signal;

(d) a synchronizing circuit;

(e) second actuator means driven by the print mechanism of the recorder for actuating said synchronizing circuit at least once each cycle to initiate a synchronizing signal;

(f) second switching means mechanically coupled to said first switching means and adapted to be actuated by said synchronizing signal to index said first switching means to a predetermined sensitive element in the event the first switching means has not reached that predetermined sensitive element at the time the recorder print mechanism has reached the corresponding recording station, said indexing occurring before said first actuator initiates the next subsequent advancing signal;

(g) third switching means mechanically coupled to said first switching means and adapted to prevent said synchronizing signal from completing a circuit through said second switching means at least once each cycle, and further adapted to cause said synchronizing signal to disconnect said control circuit from said first switching means until said second actuator is actuated in the event said first switching means reaches a predetermined sensitive element before the recorder print mechanism reaches the corresponding recording station.

2. Apparatus according to claim 1, wherein said first actuator means includes a cam operated switch driven by the print mechanism of the recorder.

3. Apparatus according to claim 2, wherein said cam operated switch is actuated once at each recording station.

4. Apparatus according to claim 1, wherein said first switching means is a spring driven stepper switch.

5. Apparatus according to claim 1, wherein said second actuator means includes a cam operated switch driven by the print mechanism of the recorder.

6. Apparatus according to claim 5, wherein said cam operated switch is actuated at least once during each cycle of the recorder.

7. Apparatus according to claim 1, wherein said synchronizing circuit includes two relays, one adapted to be actuated by said second actuator means and the other adapted to be actuated by said first switching means, said relays being connected to require both relays to be powered at a predetermined recording station before synchronized sequencing of the recorder and sensitive elements will continue.

8. Apparatus according to claim 1 wherein said control circuit includes a rectifier bridge to provide a direct current pulse to said first switching means.

References Cited

UNITED STATES PATENTS

| | | | |
|---|---|---|---|
| 3,093,003 | 6/1963 | Cochinal et al. ---- | 346—34 X |
| 3,317,672 | 5/1967 | Cestaro. | |
| 3,321,767 | 5/1967 | Fulchino ----------- | 346—34 |

ROBERT K. SCHAEFER, Primary Examiner

T. B. JOIKE, Assistant Examiner

U.S. Cl. X.R.

340—147